United States Patent [19]
Edgerton

[11] 3,891,557
[45] June 24, 1975

[54] PERIPHERAL FEED CLARIFICATION TANK

[75] Inventor: Philip Edgerton, Holicong, Pa.

[73] Assignee: FMC Corporation, Chicago, Ill.

[22] Filed: Feb. 11, 1974

[21] Appl. No.: 441,456

[52] U.S. Cl. .................................................. 210/519
[51] Int. Cl. ........................................... B01d 21/00
[58] Field of Search .......... 210/456, 512, 519, 520, 210/521, 525, 532

[56] References Cited
UNITED STATES PATENTS

| | | | |
|---|---|---|---|
| 2,961,099 | 11/1960 | Lind et al. | 210/519 |
| 2,961,100 | 11/1960 | Katz et al. | 210/519 |
| 3,017,998 | 1/1962 | Conley | 210/519 |
| 3,136,724 | 6/1964 | Lind et al. | 210/519 |
| 3,540,588 | 11/1970 | Estabrook | 210/512 X |
| 3,717,257 | 2/1973 | Boyle | 210/525 |

Primary Examiner—Theodore A. Granger
Attorney, Agent, or Firm—Dressler, Goldsmith, Clement & Gordon, Ltd.

[57] ABSTRACT

A gravity separation tank for separating suspended solids from a mixed liquor is disclosed herein. The tank has an elongated feed channel for supplying mixed liquor by gravity flow along the periphery of the tank with a clarified liquid outlet located within the tank. The channel has spaced openings located below the liquid level for feeding the mixed liquor from the channel to the tank. The channel has flow producing means therein for maintaining a velocity of flow for the mixed liquor in the channel greater than the flow of mixed liquor to the channel.

7 Claims, 3 Drawing Figures

PERIPHERAL FEED CLARIFICATION TANK

BACKGROUND OF THE INVENTION

For many years, it has been customary in the sewage treatment field to utilize final settling or separation tanks wherein a mixed liquor including a liquid having entrained solids suspended therein is supplied thereto and the liquid is maintained in a substantially quiescent state so that the suspended solids settle to the bottom of the tank floor or float to the surface of the liquid while the clarified liquid is removed therefrom and is usually returned to a water supply for further use. In this system, the settled and floating solids are continuously removed from the tank through a suitable mechanism for further process and ultimate disposal.

In sewage treatment tanks of larger size, which may be over 100 ft. in diameter or rectangular dimension, difficulties have been encountered in providing a uniform distribution of the liquid and the entrained solids throughout the periphery of the tank.

When these larger tanks came into existence, numerous developments were made for assuring uniform distribution of influent to a settling tank. Examples of such developments are disclosed in Lind et al. U.S. Pat. No. 2,961,099; Katz U.S. Pat. No. 2,961,100; Quast et al. U.S. Pat. No. 3,228,530; and Lind et al. U.S. Pat. No. 3,136,724. All of these patents disclose peripheral feed channels of various designs to accommodate the differential in hydraulic head that results from supply liquid with entrained solids from a single source to an elongated channel.

The channel designs disclosed in the above mentioned patents all provide for variations in volume along the length of the channel so that the velocity of the liquid remains constant even though the volume is constantly decreasing. This results in a substantially constant hydraulic head for the circumferentially spaced ports that lead from the channel to the main body of the tank.

Due to hydraulic factors beyond the effective control, equal distribution, if at all possible with channels of the above designs, can only occur under one specific condition of flow. Normally, this specific condition of flow is selected as the design flow for a particular sewage treatment plant. Therefore, when the mixed liquor is received into the influent channel at some other flow, the hydraulic head can vary substantially. For example, because of the diurnal and annual flow variation, a normal variation in the amount of mixed liquor supply to the tank may be from 0.5 design flow to 2.0 design flow.

Thus, at minimum flow, the velocity of the liquid in the channel may not be sufficient to prevent stratification of the solids in the channel which may mean that different quadrants of the tank will receive different amounts of solids. Also, if the velocity of flow in the channel drops below a certain minimum, the solids may settle out in the channel and become anerobic which will inhibit the treatment system.

At the opposite extreme where the mixed liquor is being supplied to the channel at twice the design flow, the variations in hydraulic head to the different ports leading from the channel to the tank, which represents the energy available to drive the mixed liquor through the openings or ports, will vary substantially between opposite ends of the elongated channel.

SUMMARY OF THE INVENTION

The present invention provides a simple method of minimizing the variations in head loss in different areas of an elongated influent channel for different volumes of flow of mixed liquor to the channel. This is accomplished by superimposing a comparatively large velocity of flow for the mixed liquor in the channel so that the variations in the head to various spaced ports in the channel will be comparatively small.

According to the invention, the influent channel has flow producing means that is capable of producing a velocity for the liquid in the channel which is at least twice the velocity of the liquid in the inlet means to the channel thereby reducing the maximum variation in the velocity of flow of the liquid around the elongated channel for different incoming flow rates.

In the specific embodiment illustrated, the flow producing means consists of a low head, high volume pump that is located at the end of the channel which is opposite the inlet and the pump lifts the mixed liquor from the end of the channel over a divider and returns it to the channel at the inlet so that there is a substantial velocity of flow in the channel regardless of the volume of mixed liquor being supplied to the channel.

If desired, the channel may also be reduced in cross-section from the inlet end to the opposite end to compensate for the liquid that flows through the ports.

DETAILED DESCRIPTION

Figure 1:
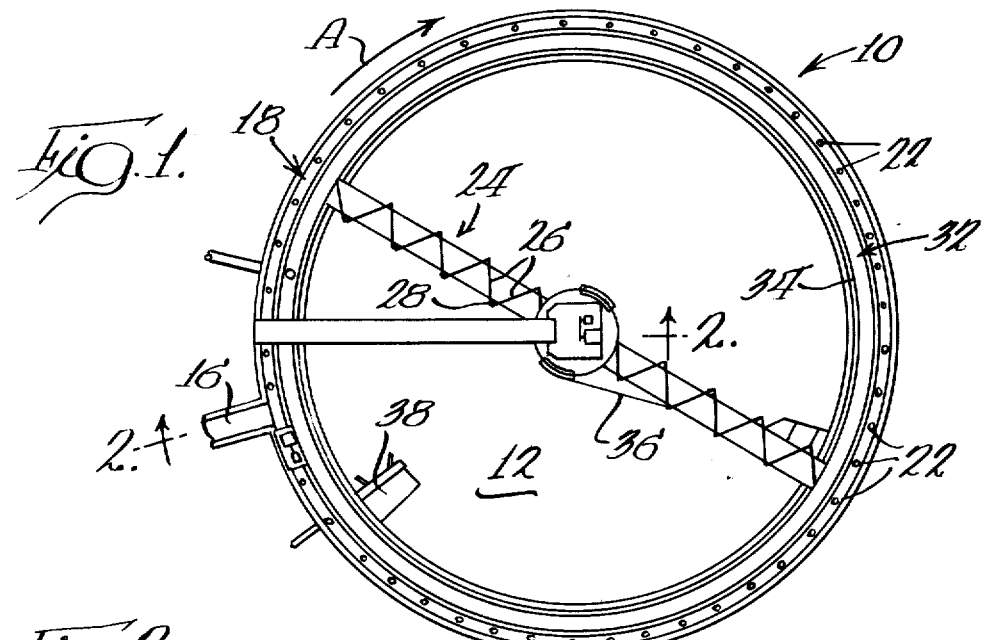
FIG. 1 shows a plan view of a clarification tank having the present invention incorporated therein.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings shows a gravity separation tank 10 which is illustrated as being circular. It will be appreciated that the tank could also be rectangular or square. Tank 10 has a floor 12 and a continuous side wall 14.

A mixed liquor consisting of liquid having suspended solids therein is delivered from a source (not shown) through influent means consisting of an inlet 16 that communicates with a continuous peripheral feed channel 18 through an opening 20 in the side wall 14 of tank 10. The mixed liquor received into the elongated channel 18 flows in the direction indicated by the arrow A and is delivered through ports 22 to tank 10. The mixed liquor that is received into the tank is maintained in a substantially quiescent state so that the suspended solids settle to the tank floor and are removed therefrom by a suitable sludge withdrawal mechanism 24.

In the illustrated embodiment, sludge withdrawal mechanism 24 consists of a plurality of blades 26 that define V-shaped troughs with conduits 28 leading from the bases of each of the V-shaped troughs to a collection zone 30 located in the center of the tank. Since the sludge withdrawal mechanism forms no part of the present invention, a detailed description thereof does not appear to be necessary.

Figure 2:
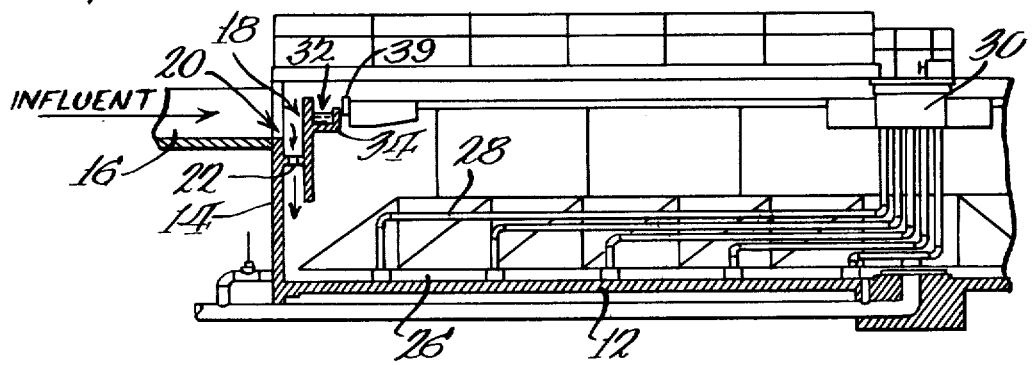
FIG. 2 is a fragmentary vertical section as viewed along line 2—2 of FIG. 1.

The clarified liquid in the tank is received into effluent means 32, which in the illustrated embodiment consists of an open topped channel having an inner wall 34 (FIG. 2), the upper edge of which defines a weir edge over which the clarified liquid flows into effluent channel. The upper edge of inner wall 34 therefore defines the liquid level in the tank.

The mixed liquor that is delivered to tank 10 may also include suspended materials that are lighter than the liquid, and these materials will float to the surface of the liquid where they are removed by scum removal of the liquid where they are removed by scum removal apparatus 36 and delivered to a scum removal trough 38 for ultimate disposal. To prevent the floating materials from entering the effluent trough 32, it is desirable to have a baffle 39 located adjacent side wall 34 and spaced therefrom with the upper and lower edges of the baffle respectively located above and below the upper edge of side wall 34.

According to the present invention, elongated channel or influent trough 18 incorporates flow producing means therein which maintains a velocity of flow of the mixed liquor in the channel at a level that is substantially greater than the maximum velocity of flow through opening 20 thereby obtaining substantially uniform distribution of the mixed liquor around the entire periphery of elongated channel 18. By maintaining a velocity in the channel which is substantially greater than the velocity of the mixed liquor through the inlet opening 20, the variations in hydraulic head to different ports located throughout the length of the channel will be minimized so that the amount of mixed liquor will be substantially uniform through each of the various ports located throughout the length of the channel. In addition, maintaining a velocity of flow of the mixed liquor within the channel at all times, virtually eliminates the possibility of separation of the suspended solids from the liquid in the influent channel.

The flow producing means consists of pump means 50 located in channel 18 adjacent inlet means 16. In order to provide a clear separation between the inlet end and the opposite end of the influent channel 18, it is preferable that the channel has divider means 52 in the form of a plate extending between side wall 14 of tank 10 and inner wall 54, which cooperate with each other to produce the opposite sides of channel 18. In addition, the divider means or plate 52 has its upper edge terminating below the upper edges of side walls 14 and 54. Thus, flow producing means 50 lifts the liquid from the opposite end of channel 18 and returns the liquid with a velocity component to the channel adjacent inlet means 16.

In order to provide a clear inlet for flow producing means 50, it is desirable that a baffle 58 extend downwardly from the upper edges of side walls 14 and 54 of channel 18 with the lower end 60 of baffle terminating above channel floor 56 to produce an inlet 61.

The flow producing means may be in the form of a pump 62 driven by a motor 64 with the pump being of the low head, high volume type which has a capacity to produce a velocity for the liquid in the channel which is at least twice the velocity of the liquid flowing through inlet means 16 under maximum flow conditions.

Figure 3:
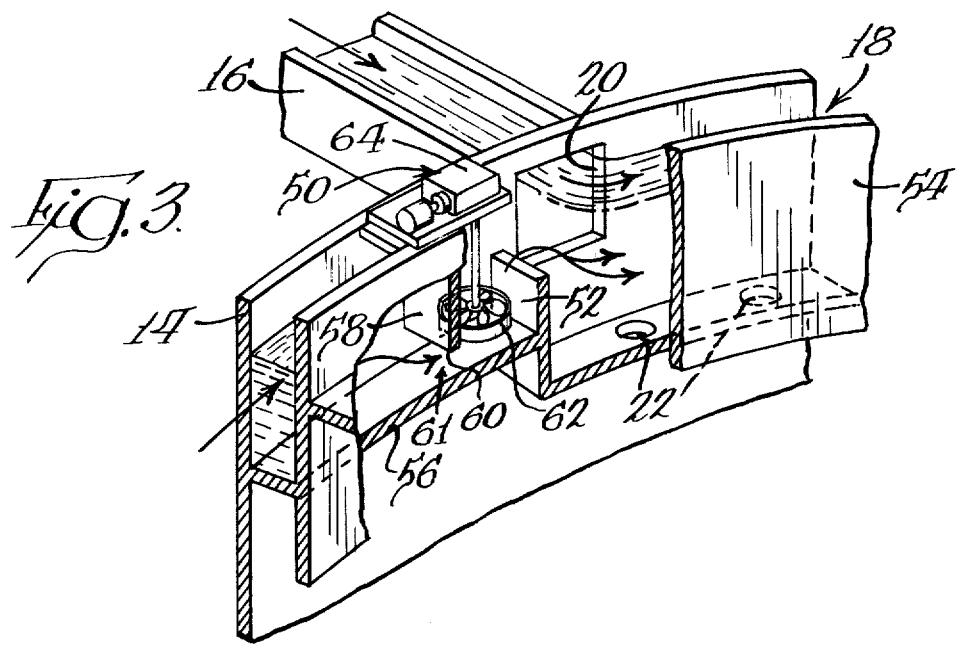
FIG. 3 is an enlarged perspective view of a portion of the upper end of the tank, with parts thereof broken away for clarity.

In the embodiment illustrated in FIG. 3, the bottom wall 54 slopes upwardly at a substantially constant rate from inlet 16 to the opposite end of channel 18 located at divider plate 52. This will produce a channel cross-section which is constantly reducing to provide further equilibrium for the velocity of flow throughout the length of the channel.

While not limited to any specific velocity of flow it is desirable to have the output of pump 62 have a capacity sufficient to produce a velocity component of flow to the mixed liquor which is twice the velocity of flow through inlet 16 at maximum flow. This means that at maximum flow through the inlet, the velocity of flow in the channel will only be about 20% greater than it will be at design flow, at minimum flow through the inlet 16, the velocity of flow in the channel will only be about 10% below the design flow velocity.

Thus, it will be appreciated that the present invention provides a simple and inexpensive expedient for insuring more uniform distribution of the liquid and suspended solids to all areas of the tank. This is accomplished with a minimum of additional equipment and components for the normal clarification tank that is now in existence and, in fact, can readily be incorporated into existing equipment with minimum alterations.

In the illustrated embodiment, the variation in cross-section for the channel is produced by sloping the bottom wall. However, it will be appreciated that this could also be accomplished by progressively decreasing the transverse dimension between side walls 14 and 54 of the channel. Furthermore, in some instances, it may not be necessary to vary the cross-section of the channel.

What is claimed is:

1. In a clarification tank having effluent means located therein for receiving clarified liquid, influent means for supplying a mixed liquor including a liquid having suspended solids therein, said influent means including an elongated channel within said tank and inlet means to said channel for supplying mixed liquor to the channel, said channel having side walls and a bottom wall, one of said walls having openings therein in communication with said tank to supply mixed liquor to said tank, and a pump means within said channel spaced from said inlet means for increasing the velocity of said mixed liquor in said channel to a point which is greater than the velocity of said mixed liquor through said inlet means.

2. A clarification tank as defined in claim 1, in which said channel is continuous around the periphery of said tank with divider means in said channel adjacent said inlet means, said divider means defining an opposite end for said channel, said pump means being located adjacent said opposite end of said channel.

3. A clarification tank as defined in claim 2, in which said tank is circular.

4. A clarification tank as defined in claim 2, in which said channel is of constantly reducing cross-section throughout the length thereof.

5. In a clarification tank having effluent means located therein for receiving clarified liquid, influent means for supplying a mixed liquor including a liquid having suspended solids therein, said influent means including an elongated continuous channel around the periphery of said tank inlet means defining a first end to said channel for supplying mixed liquor to said channel, said channel having side walls and a bottom wall, one of said walls having openings therein in communication with said tank to supply mixed liquor to said tank, divider means in said channel spaced from said first end and defining a second end to said channel, a pump within said channel spaced from said first end and adjacent said second end for maintaining a velocity for said mixed liquor in said channel which is greater than the velocity of said mixed liquor through said inlet means, and baffle means in said channel between said first end and said pump, said baffle means terminating above said bottom wall in said channel to define an inlet for said pump.

6. A clarification tank as defined in claim 5, in which said tank and channel are circular in plan.

7. A clarification tank as defined in claim 5, in which said channel is of constantly reducing cross-section throughout the length thereof.

* * * * *